United States Patent [19]

Aldag, Jr.

[11] Patent Number: 4,566,967

[45] Date of Patent: Jan. 28, 1986

[54] CATALYTIC REFORMING

[75] Inventor: Arthur W. Aldag, Jr., Bartlesville, Okla.

[73] Assignee: Phillips Petroleum Company, Bartlesville, Okla.

[21] Appl. No.: 708,143

[22] Filed: Mar. 4, 1985

[51] Int. Cl.$^4$ .............................................. C10G 35/06
[52] U.S. Cl. .................................................. 208/135
[58] Field of Search ........................................ 208/135

[56] References Cited

U.S. PATENT DOCUMENTS

| | | | |
|---|---|---|---|
| 2,822,336 | 2/1958 | Polack | 252/465 |
| 2,906,713 | 9/1959 | Hunter et al. | 252/453 |
| 3,461,177 | 8/1969 | Box et al. | 585/419 |
| 4,263,133 | 4/1981 | Drehman et al. | 208/134 |
| 4,396,497 | 8/1983 | Myers et al. | 208/135 |
| 4,446,013 | 5/1984 | Aldag et al. | 208/135 |

Primary Examiner—Curtis R. Davis

[57] ABSTRACT

A reforming process employing a catalyst composition selected from the group consisting of a catalyst consisting essentially of zinc oxide and a spinel alumina wherein insufficient zinc is present for the formation of a bulk zinc aluminate and a catalyst composition consisting essentially of a physical mixture of zinc aluminate and a spinel alumina wherein insufficient zinc is present for the formation of a bulk zinc aluminate.

16 Claims, No Drawings

CATALYTIC REFORMING

This invention relates to a process and catalyst for reforming a feedstock which contains at least one reformable organic compound to increase the octane number of gasoline produced from the feedstock.

Petroleum processing requires a number of separate process steps to change the petroleum feedstock into desired products. At least one initial process step which may be utilized is reforming.

Reforming is the term which is utilized to refer to a number of process steps which are all designed to increase the octane number of gasoline range materials having a normal boiling range between about 50° C. and about 200° C. (generally referred to as a naphtha feedstock). The most important aspect of reforming is the dehydrogenation of cyclohexane and its derivatives to aromatics. Other aspects of reforming are the cyclization of paraffins to either cyclopentane and its derivatives or cyclohexane and its derivatives. Paraffins cyclized to cyclopentane and its derivatives are isomerized to cyclohexane and its derivatives for subsequent aromatization.

Hydrogen must be added to the reforming process to prevent the cyclopentane and its derivatives which are present in the naphtha feedstock or which are produced by the cyclization of paraffins from being converted to carbon which will very quickly foul the reforming catalyst. In the presence of hydrogen, cyclopentane and its derivatives are isomerized to cyclohexane and its derivatives. Cyclohexane and its derivatives may be dehydrogenated to aromatics and the fouling of the catalyst is substantially prevented.

At present, most reforming processes utilize dual function catalysts that contain platinum, either alone or in combination with other precious metals, on an acidic support such as activated alumina that contains a minor amount of chloride or fluoride ions. Catalysts containing precious metals are expensive and it would be desirable to supplement or replace precious metals-containing catalysts for hydrocarbon reforming processes. It is thus an object of this invention to provide a reforming and hydrocracking process in which a novel catalyst which does not contain precious metals is used.

In accordance with the present invention, a catalyst composition selected from the group consisting of a catalyst consisting essentially of zinc oxide and a spinel alumina where insufficient zinc is present for the formation of a bulk zinc aluminate and a catalyst consisting essentially of a physical mixture of zinc titanate and a spinel alumina where insufficient zinc is present for the formation of a bulk zinc aluminate is utilized in a reforming process. The reforming process preferably has alternate reaction periods and regeneration periods. The reforming process is carried out under suitable conditions in the substantial absence of free oxygen. Hydrogen is added to the reforming process. The catalyst regeneration process is carried out in the presence of a free oxygen-containing gas to remove carbonaceous material which may have formed on the catalyst during the reforming process.

The use of the inventive catalyst composition in a reforming process results in a reduced expense due to the reduced use of precious metals-containing catalyst and also results in improvements with respect to other catalyst containing zinc oxide or zinc titanate as will be more fully described hereinafter.

Any suitable reformable organic compound can be reformed in accordance with the present invention. Organic compounds which are considered to be advantageously and efficiently reformed in accordance with the process of this invention are the gasoline range materials having a normal boiling range between about 50° C. and about 205° C. Examples of the gasoline range materials suitable for reforming include cyclopentane and its derivatives, cyclohexane and its derivatives, n-heptane, n-octane, n-nonane, monomethyl derivatives of n-heptane, n-octane, n-nonane and the like, and mixtures of any two or more thereof.

The feedstock may contain sulfur compounds without impairing the activity of the catalyst. However, sulfur will generally be converted to hydrogen sulfide at reforming conditions. Thus, it is preferable to use desulfurized feed to obviate the need for removal of the hydrogen sulfide downstream from the reformer.

With respect to the catalyst of the present invention containing zinc oxide, such catalyst may be formed by any suitable method. Particularly preferred methods are forming a hydrogel derived catalyst or physical mixing. Impregnation techniques may also be used if desired. A particularly preferred method is a physical mixture because of the ease of preparation and the activity of the catalyst. The zinc titanate containing catalyst of the present invention is also formed as a physical mixture.

Any suitable spinel structure alumina may be utilized in the preparation of the catalyst compositions. Suitable aluminas having a spinel structure are eta or gamma alumina. Aluminas not having the spinel structure should not be utilized as will be more fully illustrated in the examples. A particularly preferred form of alumina for use in the catalyst composition is Catapal alumina which is a gamma alumina produced by Conoco.

To prepare the mixture catalyst containing zinc oxide or the mixture catalyst containing zinc titanate, suitable portions of zinc oxide or zinc titanate are intimately mixed with a spinel alumina. The zinc oxide, zinc titanate and alumina are all preferably reduced by crushing and screening to a size in the range of about 18 mesh to about 40 mesh to facilitate such mixing. Smaller than 40 mesh may be utilized but it has been found that smaller particles may create pressure drop problems in the reactor. Also, larger particles could be utilized but effective mixing may be inhibited and the surface area presented will not be as great with larger particles.

After the physical mixing, the catalyst is ready for use. No special steps such as drying or calcining are required.

Any suitable zinc oxide may be used in the catalyst composition. Zinc oxide is commercially available from a number of sources.

The zinc titanate may be prepared by intimately mixing suitable portions of zinc oxide and titanium dioxide, preferably in a liquid such as water, and calcining the mixture in the presence of free oxygen at a temperature in the range of about 650° C. to about 1050° C., preferably in the range of about 675° C. to about 975° C., to form zinc titanate. A calcining temperature in the range of from about 800° C. to about 850° C. is most preferred because the surface area is maximized in this temperature range, thus producing a more active catalyst. The titanium dioxide used in preparing the zinc titanate preferably has extremely fine particle size to promote intimate mixing of the zinc oxide and titanium dioxide. This produces a rapid reaction of the zinc oxide and titanium dioxide which results in a more active catalyst.

Preferably the titanium dioxide has an average particle size of less than 100 millimicrons and more preferably less than 30 millimicrons. Flame hydrolyzed titanium dioxide has extremely small particle size and is particularly preferred in preparing the catalyst. The atomic ratio of zinc to titanium can be any suitable ratio. The atomic ratio of zinc to titanium will generally lie in the range of about 1:1 to about 3:1 and will preferably lie in the range of about 1.8:1 to about 2.2:1 because the activity of the catalyst is greatest for atomic ratios of zinc to titanium in this range. The term "zinc titanate" is used regardless of the atomic ratio of zinc to titanium.

The zinc titanate may also be prepared by coprecipitation from aqueous solutions of a zinc compound and a titanium compound. The aqueous solutions are mixed together and the hydroxides are precipitated by the addition of ammonium hydroxide. The precipitation is then washed, dried and calcined, as described in the preceding paragraph, to form zinc titanate. This method of preparation is less preferred than the mixing method because the zinc titanate prepared by the coprecipitation method is softer than the zinc titanate prepared by the mixing method.

In general, to prepare the hydrogel derived catalyst containing zinc oxide, zinc oxide is first reduced to a small size. The resulting material is mixed with a hydrosol of a spinel alumina. A suitable base is then added to the mixture to form a hydrogel. The resulting hydrogel is dried slowly and calcined to form a hydrogel derived catalyst of zinc oxide and spinel alumina.

The zinc oxide may be reduced to a suitable size for mixing with a hydrosol of alumina by any suitable method such as treatment in an ultrasonic disrupter. The zinc oxide may be reduced to any suitable size with a particle size in the range of about 1 to about 10 microns being preferred.

The resulting zinc oxide having a fine particle size is mixed with a hydrosol of spinel alumina. After the zinc oxide has been thoroughly mixed into the hydrosol, a suitable base is added to convert the hydrosol to a hydrogel. Any suitable base such as alkali metal hydroxides, ammonium hydroxide, or urea may be utilized. Ammonium hydroxide is the preferred base because it does not have any metallic component that would remain in the hydrogel.

The resulting hydrogel is dried slowly so that water will not be removed so rapidly that the hydrogel structure will collapse which would result in excessive loss of pore volume and surface area of the finished zinc oxide hydrogel derived catalyst. Any suitable drying time can be utilized which does not result in too rapid removal of water. Preferably, the drying time is in the range of about 8 hours to about 24 hours.

Any suitable temperature can be utilized for the drying of the zinc oxide hydrogel but again the temperature should be such that too rapid a removal of water does not result. The temperature is preferably in the range of about 35° C. to about 150° C. The most preferred drying condition is to start the drying process at about 80° C. and increase the temperature slowly to about 120° C. during the drying time.

After the zinc oxide hydrogel has been dried, the zinc oxide hydrogel derived catalyst is calcined in the presence of free oxygen. Any suitable free oxygen-containing gas may be utilized with air being preferred because of its availability. Also, any suitable time and temperature for the calcining may be utilized with a preferred time being about two hours and a preferred temperature being in the range of about 425° C. to about 550° C. Although the dried zinc oxide hydrogel derived catalyst can be placed directly into a preheated furnace or kiln for calcining, it is preferable for the catalyst to attain its final temperature during a heating period of about two hours. Higher calcining temperatures should be avoided because of loss of reforming activity.

If an impregnation technique is to be used for the zinc oxide containing catalyst, the zinc oxide may be added to the alumina by impregnating the spinel alumina with a solution—aqueous or organic—that contains zinc oxide. The spinel alumina can be one 1/32 inch or larger extrudate, preferably about 1/16 inch extrudate, although this is not required. After the zinc oxide has been added to the spinel alumina, the catalyst composition is dried to remove essentially all the solvent. The catalyst composition is then calcined in the presence of oxygen at a temperature in the range of about 425° C. to about 550° C. for a time in the range of about 2 to about 8 hours.

For all of the catalysts, it is important that the concentration of zinc and the conditions of preparation be such that a bulk zinc aluminate is not formed. By bulk zinc aluminate it is meant that substantially all of the zinc is present in the form of zinc aluminate. Preferably, the ratio of zinc oxide to alumina when the catalyst preparation is begun will be in the range of about 10 weight percent to about 30 weight percent based on the weight of the total components. For zinc titanate, the concentration of zinc titanate will be in the range from about 10 weight percent to about 50 weight percent.

The process of this invention can be carried out by means of any apparatus whereby there is achieved an alternate contact of the catalyst with the organic compound to be reformed and thereafter of the catalyst with the oxygen-containing gas. The process is in no way limited to the use of a particular apparatus. The process of this invention can be carried out using a fixed catalyst bed, fluidized catalyst bed or moving catalyst bed. Presently preferred is a fixed catalyst bed.

In order to avoid any casual mixing of the organic feed and the oxygen containing fluid utilized in the regeneration step, provision is preferably made for terminating the flow of feed to the reactor and injecting an inert purging fluid such as nitrogen, carbon dioxide or steam. Any purge time suitable to prevent mixing of the organic feed and the oxygen containing fluid can be utilized. The purge duration will generally range from about 1 minute to about 10 minutes and will more preferably range from about 3 minutes to about 6 minutes. Any suitable flow rate of the purge gas may be utilized. Presently preferred is a purge fluid flow rate in the range of about 800 GHSV to about 1200 GHSV.

Any suitable temperature for reforming organic compounds over the catalyst can be utilized. The reforming temperature will generally be in the range of about 427° to about 593° C. and will more preferably be in the range of about 510° C. to about 566° C.

Any suitable pressure for the reforming of the organic feedstock over the catalyst can be utilized. In general, the pressure will be in the range of about 50 to about 700 psig and will more preferably be in the range of about 150 to about 350 psig. The pressure will be in terms of total system pressure where total system pressure is defined as the sum of the partial pressures of the organic feedstock, the hydrogen added to the process, and the hydrogen produced in the process.

Any quantity of hydrogen suitable for substantially preventing the formation of coke can be added to the reforming process. The quantity of hydrogen added will generally be in the range of about 0.5 to about 20 moles per mole of hydrocarbon feed and will more preferably be in the range of about 2 to about 10 moles of hydrogen per mole of feedstock.

Any suitable residence time for the organic feedstock in the presence of the catalyst can be utilized. In general, the residence time in terms of the volume of liquid feedstock per unit volume of catalyst per hour (LHSV) will be in the range of about 0.1 to about 10 and will more preferably be in the range of about 0.5 to about 5.

Any suitable time for the regeneration of the reforming catalyst can be utilized. The time for the regeneration of the catalyst will generally be in the range of from about 5 minutes to about 60 minutes and will more preferably be in the range of from about 10 minutes to about 30 minutes. The regeneration effluent should be substantially free of carbon dioxide at the end of the regeneration period.

The amount of oxygen, from any source, supplied during the regeneration step will be at least the amount sufficient to remove substantially all carbonaceous materials from the catalyst. The regeneration step can be conducted at the same temperature and pressure recited for the reforming step although somewhat higher temperatures can be used, if desired.

Catalysis of the reforming reaction in accordance with the present invention is most effective with the use of relatively short process periods with intervening periods of oxidative regeneration. The duration of the reforming process period will generally be in the range of about 1 minute to about 4 hours with a duration of about 5 minutes to about 60 minutes being preferred.

The operating cycle for the reforming process will generally include the successive steps of:
(1) contacting the organic feed with the catalyst to thereby reform the organic feed;
(2) terminating the flow of the organic feed to the reactor;
(3) optionally, purging the catalyst with an inert fluid;
(4) contacting the catalyst with free oxygen to regenerate the catalyst;
(5) terminating the flow of free oxygen to the reactor; and
(6) optionally, purging the thus regenerated catalyst with an inert fluid before repeating step (1).

The following examples are presented in further illustration of the invention.

CATALYST PREPARATION

A zinc titanate catalyst was prepared in accordance with the procedure set forth in Example I of U.S. Pat. No. 4,263,133 by United Catalyst, Inc., Louisville, Ky. The catalyst had an atomic ratio of zinc to titanium of 1.8. The surface area was 13 m²/g. This catalyst is referred to hereinafter as Catalyst A.

A plurality of zinc titanate hydrogel catalyst were prepared in accordance with the procedure set forth in Example I of U.S. Pat. No. 4,446,013 using Catalyst A and Catapal alumina. These catalysts, which are referred to hereinafter as Catalysts B-E, had the following characteristics.

TABLE I

| Catalysts | Beginning % $Zn_2TiO_4$ | Calcination Temp. (°F.) | Calcination Time (Hrs) | Surface Area (m²/g) |
|---|---|---|---|---|
| B | 10 | 800 | 2 | 264 |
| C | 30 | 800 | 2 | 196 |
| D | 50 | 800 | 2 | 134 |
| E | 30 | 1200 | 2 | 135 |

A plurality of hydrogel derived zinc oxide catalysts were also prepared in the same manner as set forth for the hydrogel derived zinc titanate catalysts described above except that the starting material was zinc oxide as opposed to zinc titanate. Characteristics of these catalysts which are referred to hereinafter as Catalysts F-H were as follows:

TABLE II

| Catalysts | Beginning % ZnO | Calcination Temp. (°F.) | Calcination Time (Hrs) | Surface Area (m²/g) |
|---|---|---|---|---|
| F | 10 | 1000 | 2 | 212 |
| G | 20 | 800 | 2 | 220 |
| H | 44 | 800 | 2 | 147 |

Two physical mixtures were prepared by mixing 18/40 mesh particles of zinc oxide or zinc titanate with equal size Catapal alumina particles. No additional processing steps were utilized. For the zinc titanate mixture, the initial composition contained 30 weight percent zinc titanate. For the zinc oxide mixture, the initial composition contained 20 weight percent zinc oxide. The mixture containing zinc titanate is referred to hereinafter as Catalyst I. The mixture containing zinc oxide is referred to hereinafter as Catalyst J.

Two commercially available reforming catalysts were utilized for comparisons. One such catalyst was a platinum-rhenium-alumina catalyst supplied by UOP and designated as R-50. This catalyst is referred to hereinafter as Catalyst K. The other catalyst was a molybdenum-alumina catalyst supplied by Oromite Chemical Co. and designated as R-592. This catalyst is referred to hereinafter as Catalyst L.

Catapal alumina alone was designated as Catalyst M.

A mixed catalyst containing chi alumina (not a spinel structure) was also used for comparison. The preparation was the same as for catalyst I except for the alumina used. This catalyst is referred to hereinafter as Catalyst N.

EXAMPLE II

Catalysts A-N were used in runs to reform a naphtha feedstock. Properties of the naphtha feedstock are set forth in Table III.

TABLE III

| Naphtha Properties | |
|---|---|
| API Gravity = | 56.2 |
| Research Octane Number Clear (RONC) = | 57.0 |
| Compositions (vol %) | |
| Paraffins | 45.62 |
| Naphthenes | 45.32 |
| Aromatics | 9.06 |
| Distillation (°F.) | |
| IBP/10 | 188/206 |
| 20/30 | 212/219 |
| 40/50 | 228/238 |
| 60/70 | 251/271 |
| 80/90 | 292/316 |
| 95/EP | 332/379 |

All catalysts were sized to 18/40 mesh. Runs were made using 25 cc of the catalyst mixed with an equal volume of quartz chips. The catalyst mixed with quartz chips were placed in a stainless steel reactor mounted vertically in a temperature controlled electric furnace. The feed passed downflow through the reactor and the resulting liquid products were collected for subsequent GLC analysis. Samples were taken every 8 hours. The Research Octane Number Clear (RONC) was measured the octane number measuring system described in U.S. Pat. No. 4,331,024. All runs were made at 200 psig, 1.0 LHSV and a hydrogen:naphtha feed mole ratio of 4. Results of the runs are set forth in Table IV.

derived zinc titanate catalyst. However, Catalyst H contains sufficient zinc oxide to form the stoichiometric compound zinc aluminate. This catalyst was considerably less active than the other hydrogel derived zinc oxide catalyst as is evidenced by the significantly lower octane number. Thus, it is believed that concentrations of zinc oxide or zinc titanate sufficient to form the stoichiometric compound zinc aluminate should be avoided as is more fully described in the foregoing description of the invention.

Runs 16 and 17 present some very surprising results. These runs illustrate that physical mixtures are as active as the hydrogel derived catalyst and have about the same reforming efficiency.

TABLE IV

| Run | Catalyst | Temp. (°F.) | Run Time[1] | Average RONC | Reformate Reformate Yield | Average Barrel-Octane |
|---|---|---|---|---|---|---|
| 1 (Control) | K(Pt) | 850 | 48 hrs. | 92.6 | 85 | 7870 |
| 2 (Control) | K(Pt) | 875 | 104 hrs. | 97.8 | 80.9 | 7910 |
| 3 (Control) | K(Pt) | 900 | 95 hrs. | 100.9 | 77.3 | 7800 |
| 4 (Control) | L(MoAl) | 925 | 6 cycles | 101.8 | 62.7 | 6525 |
| 5 (Control) | L(MoAl) | 950 | 8 cycles | 103.6 | 59.2 | 6130 |
| 6 (Control) | M(Al alone) | 975 | 3 cycles | 79.4 | 78.5 | 6233 |
| 7 (Control) | A(ZnTi alone) | 975 | 2 cycles | 74.5 | 89.7 | 6683 |
| 8 (Control) | B(ZnTi Hydrogel) | 975 | 39 hrs. | 99.0 | 72.1 | 7140 |
| 9 (Control) | C(ZnTi Hydrogel) | 975 | 66 hrs. | 100.0 | 71.4 | 7140 |
| 10 (Control) | D(ZnTi Hydrogel) | 975 | 120 hrs. | 97.8 | 72.6 | 7100 |
| 11 (Control) | E(ZnTi Hydrogel) | 975 | 69 hrs. | 102.3 | 67.3 | 6890 |
| 12 (Inventive) | F(ZnO Hydrogel) | 975 | 62 hrs. | 95.4 | 75.9 | 7245 |
| 13 (Inventive) | G(ZnO Hydrogel) | 975 | 28 hrs. | 99.0 | 71.7 | 7100 |
| 14 (Inventive) | G(ZnO Hydrogel) | 975 | 22 hrs. | 104.2 | 62.5 | 6515 |
| 15 (Inventive) | H(ZnO Hydrogel) | 975 | 4 cycles | 90.8 | 78.9 | 7165 |
| 16 (Inventive) | I(ZnTi Mix) | 975 | 116 hrs. | 100.1 | 71.7 | 7177 |
| 17 (Inventive) | J(ZnO Mix) | 975 | 110 hrs. | 98.3 | 71.3 | 7009 |
| 18 (Control) | N(ZnTi Mix) | 975 | 15 hrs. | 83.4 | 87.5 | 7298 |

[1]Where hrs. are indicated, runs were continuous. Where cycles are indicated, reforming run lengths were 7-8 hours with overnight regeneration in an air-nitrogen mixture (20% air).

In Table IV, the reformate yield is the yield of $C_5+$ liquids. The average barrel-octane is the product of the average RONC and the average reformate yield and is utilized as a quantitative measure of the reforming efficiency when comparing reformates of comparable RONC produced by different catalysts or operating conditions.

Referring now to Table IV, results for runs 1-3 which used the platinum-containing commercial catalyst demonstrated that, as expected, reforming efficiency was high as is evidenced by the high octane numbers obtained at low temperatures. In like manner, runs 4 and 5 show that the molybdenum-containing commercial catalyst was also very active as evidenced by the high octane numbers but the reformate yield dropped significantly. Runs 6 and 7 illustrate that the Catapal alumina alone or zinc titanate alone are considerably less active for reforming than the other catalysts tested as is evidenced by the low octane number.

Runs 8-11 show that the hydrogel derived catalyst of zinc titanate is active for reforming and also has a greater reforming efficiency at the same octane numbers than the molybdenum-containing commercial catalysts as illustrated by the average barrel-octane number. It is also noted that, while the reforming activity was high for the catalyst calcined at 1200° F., the reforming efficiency was lower as is evidenced by the lower average barrel-octane number for Catalyst E.

Based on this result, it is believed that higher calcining temperatures should be avoided as is more fully described in the foregoing description of the invention.

Results for runs 12-15 illustrate that the hydrogel derived catalyst of zinc oxide is also active for reforming and were in general as efficient as the hydrogel Run 18 demonstrates that use of an alumina not having a spinel structure results in less activity as is evidenced by the significantly lower octane number when compared to Run 16. Based on this result, it is believed that the use of a spinel structure alumina is important as previously described.

A zinc oxide catalyst prepared by impregnation was not tested. However, based on the results with the hydrogel derived catalyst and the physical mixture, it is believed that a zinc oxide catalyst prepared by impregnation would also be effective for reforming.

Reasonable variations and modifications are possible within the scope of the disclosure and the appended claims to the invention.

That which is claimed is:

1. A process for the catalytic reforming of a feedstock which contains at least one reformable organic compound comprising the step of contacting said feedstock under suitable reforming conditions with a catalyst composition selected from the group consisting of a catalyst consisting essentially of zinc oxide and a spinel structure alumina and a catalyst consisting essentially of a physical mixture of zinc titanate and a spinel structure alumina in the presence of sufficient added hydrogen to substantially prevent the formation of coke, wherein insufficient zinc is present in said catalyst composition for the formation of a bulk zinc aluminate.

2. A process in accordance with claim 1 wherein said catalyst composition is a physical mixture of zinc titanate and a spinel structure alumina.

3. A process in accordance with claim 2 wherein said zinc titanate is prepared by calcining a mixture of zinc oxide and titanium dioxide in the presence of free oxygen at a temperature in the range of about 650° C. to about 1050° C.

4. A process in accordance with claim 3 wherein said spinel structure alumina is selected from the group consisting of eta and gamma aluminas.

5. A process in accordance with claim 4 wherein the size of the particles of said zinc titanate and said spinel structure alumina in said catalyst composition are in the range of about 18 mesh to about 40 mesh.

6. A process in accordance with claim 2 wherein the concentration of zinc titanate in said catalyst composition is in the range of about 10 weight percent to about 50 weight percent based on the weight of the total mixture.

7. A process in accordance with claim 1 wherein said catalyst composition is a physical mixture of zinc oxide and a spinel structure alumina.

8. A process in accordance with claim 7 wherein said spinel structure alumina is selected from the group consisting of eta and gamma aluminas.

9. A process in accordance with claim 8 wherein the size of the particles of said zinc oxide and said spinel structure alumina in said catalyst composition are in the range of about 18 mesh to about 40 mesh.

10. A process in accordance with claim 7 wherein the concentration of zinc oxide in said catalyst composition is in the range of about 10 weight percent to about 30 weight percent based on the weight of the total mixture.

11. A process in accordance with claim 1 wherein said catalyst composition is a hydrogel derived catalyst of zinc oxide and a spinel structure alumina.

12. A process in accordance with claim 11 wherein the concentration of zinc oxide in said catalyst composition is in the range of about 10 weight percent to about 30 weight percent based on the weight of the total mixture.

13. A process in accordance with claim 11 wherein said hydrogel derived catalyst of zinc oxide and a spinel structure alumina is calcined in the presence of free oxygen at a temperature in the range of about 425° C. to about 550° C. for a time in the range of about 2 to about 8 hours.

14. A process in accordance with claim 1 wherein said at least one reformable organic compound is a gasoline range material having a normal boiling range between about 50° C. and about 205° C.

15. A process in accordance with claim 14 wherein said suitable reforming conditions comprise a residence time for said feedstock in the presence of said catalyst composition of about 0.1 to about 10 liquid volumes of feedstock per unit volume of said catalyst composition per hour, a temperature in the range of about 427° C. to about 593° C., a pressure in the range of about 50 psig to about 700 psig, and a hydrogen flow rate suitable to provide about 0.5 mole to about 20 moles of hydrogen per mole of said feedstock.

16. A process in accordance with claim 14 wherein said suitable reforming conditions comprise a residence time for said feedstock in the presence of said catalyst composition of about 0.5 to about 5 liquid volumes of feedstock per unit volume of said catalyst composition per hour, a temperature in the range of about 510° C. to about 566° C., a pressure in the range of about 150 psig to about 350 psig, and a hydrogen flow rate suitable to provide about 2 moles to about 10 moles of hydrogen per mole of said feedstock.

* * * * *